United States Patent [19]

Sizyakov et al.

[11] 4,455,284
[45] Jun. 19, 1984

[54] PROCESS FOR DESILICATION OF ALUMINATE SOLUTION

[75] Inventors: Viktor M. Sizyakov; Nikolai A. Kaluzhsky, both of Leningrad; Khoren A. Badaiants, Pikalevo;; Ivan M. Kostin, Pikalevo; Isaak A. Zatulovsky, Pikalevo; Evgeny A. Isakov, Pikalevo; Zarya N. Alexandrova, Pikalevo; Valentin N. Afanasiev, Pikalevo; Vinetsy I. Chernov, Pikalevo; Alexandr G. Zhukov, Pikalevo; Viktor S. Kutsenko, Pikalevo; Galina M. Vysotskaya, Leningrad; Evgenia S. Ostrovlyanchik, Kolomna; Evgeny I. Mironov, Achinsk; Pavel S. Vladimirov; Alexei I. Alexeev, both of Leningrad, all of U.S.S.R.; Leonid I. Finkelshtein, deceased, late of Achinsk; Nina J. Finkelshtein, administrator; Julia L. Finkelshtein, administrator, both of Lvov, U.S.S.R.

[73] Assignee: Vsesojuzny Nauchnoissledovatelsky I Proektny Institut Aljuminievoi, Magnievoi I Elektrodnoi Promyshlennosti, Leningrad, U.S.S.R.

[21] Appl. No.: 458,781

[22] Filed: Jan. 18, 1983

[51] Int. Cl.$^3$ .............................................. C01F 7/02
[52] U.S. Cl. .................................. 423/119; 423/121; 423/122; 423/124
[58] Field of Search ................ 423/121, 122, 128-130, 423/119

[56] References Cited

U.S. PATENT DOCUMENTS

| 938,432 | 10/1909 | Peffer | 423/122 |
| 2,442,266 | 5/1948 | Wall | 423/122 |

FOREIGN PATENT DOCUMENTS 45-28297 9/1970 Japan .

| 363327 | 2/1973 | U.S.S.R. | 423/122 |
| 468887 | 7/1975 | U.S.S.R. | 423/122 |
| 506577 | 5/1976 | U.S.S.R. | 423/119 |
| 236440 | 4/1977 | U.S.S.R. | 423/122 |

OTHER PUBLICATIONS

I. Z. Pevzner, N. A. Makarov "Disilication of Aluminate Solutions", Metallugia, Moscow, 1974.
A. I. Liner "Aluminia Manufacture", State Scientific/Technical Publishing House for Ferrous and Non-Ferrous Metallurgy, Moscow, 1961.
English Language Translation of Letters Patent of Federal Republic of Germany, No. 752,739, 1943.

Primary Examiner—Herbert T. Carter
Attorney, Agent, or Firm—Fleit, Jacobson, Cohn & Price

[57] ABSTRACT

The present invention relates to the production of alumina and, more specifically, to a process for desilication of aluminate solutions.

The process of desilication according to the present invention comprises treatment of the aluminate solution first with a calcium-containing reagent "a" which is a product of the reaction of desilication of the aluminate solution; reagent "a" contains mainly calcium hydrogarnet of the formula:

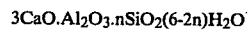

$$3CaO.Al_2O_3.nSiO_2(6-2n)H_2O$$

wherein $n \leq 1$, and then with a reagent "b" of the formula:

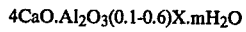

$$4CaO.Al_2O_3(0.1-0.6)X.mH_2O$$

wherein X is $CO_2$ and/or $SO_3$; m=8 to 15. The treatment of the aluminate solution with reagent "a" is carried out for 0.5 to 2 hours at a temperature ranging from 40° to 105° C. Weight ratio of reagents "a" and "b" is maintained within the range of from 1:1 to 3:1.

The process according to the present invention is useful in the manufacture of alumina.

4 Claims, No Drawings

PROCESS FOR DESILICATION OF ALUMINATE SOLUTION

FIELD OF THE INVENTION

The present invention relates to the manufacture of alumina from alumina-containing raw materials and, more specifically, to processes for desilication of aluminate solutions.

Aluminate solutions are obtained in the manufacture of alumina as a result of leaching of aluminate clinkers. Aluminate solutions generally contain a substantial amount of silica of from 0.2 to 0.5 g/l of $SiO_2$. The solutions are not suitable for the manufacture of alumina employed in the production of aluminium. For this reason, such aluminate solutions should be subjected to purification from $SiO_2$, i.e. desilication.

BACKGROUND OF THE INVENTION

Known in the art is a process for desilication of aluminate solutions involving the use of additives such as compounds of alkali-earth metals including dolomite (cf. FRG Pat. No. 752,739 and Japanese Pat. No. 28297/70 of Nov. 17, 1965 Cl. 15F 251.1).

However, this process has not been commercially realized, since the degree of desilication of an aluminate solution does not exceed 60-80%. Furthermore, the process proceeds at a very slow speed.

In order to intensify the desilication process and increase the degree of desilication of aluminate solutions it has been suggested to calcine dolomite ground to a fineness of 50 mesh in a rotary furnace at a temperature within the range of from 1,500° to 1,600° C. during calcination of dolomite, 0.5-6% of iron powder is added thereto thus resulting in the formation of iron scale at the surface of dolomite particles. The use of such a desilication agent results in a degree of desilication of solutions as high as 99.7%. The desilication process is performed at a temperature within the range of from 100 to 300° C. under a pressure of from 1 to 150 atm, over the heating time about 0.5 hour and more in the presence of 1-50 g/l of dolomite. The best results are obtained at a temperature of from 150° to 200° C., pressure of 1 to 20 atm, process duration of from 1 to 3 hours and addition of dolomite in an amount of 5-10 g/l. It is also possible to perform the process in two stages. (Cf. U.S. Pat. No. 2,442,226 of Mar. 14, 1944).

However, practical use of this process has shown that the degree of desilication was only 90-92%; the solutions were contaminated with iron oxide thus hindering the manufacture of top-grade alumina. Furthermore, the use of elevated temperatures in the process results in considerable power and material consumption rates, i.e. 2 Gcal of steam and 300-400 kg of $Al_2O_3$ per ton of dolomite.

Also known in the art is a process for desilication of aluminate solutions involving treatment thereof with lime. The effect of lime in the desilication treatment is based on cation exchange accompanied by the formation of an alumosilicate, wherein sodium ions are substituted with calcium ions; the composition of calcium alumosilicate in white slime is $CuO.Al_2O_3.17SiO_2.nH_2O$.

A lesser solubility thereof in aluminate solutions causes a better desilication in the presence of lime. In doing so, as it has been experimentally shown, losses of $Na_2O$ in white slime are smaller, though losses of $Al_2O_3$ are greater. The reason of the phenomenon resides in that lime is always added in excess for a better elimination of $SiO_2$, though this also results in the evolution, along with alumosilicates, of calcium hydroaluminate as well. The stronger aluminate solutions, the higher are losses of $Al_2O_3$ per unit weight of silica. In the presence of lime, precipitated from concentrated solutions upon desilication are solid solutions consisting of lime hydroaluminate and sodium alumosilicate thus causing increased losses of $Al_2O_4$.

At the same time, losses of $Na_2O$ are also increased approaching the losses observed for desilication without lime. The stronger aluminate solutions, the higher is the amount of NaOH therein and the worse the desilication process.

Therefore, incorporation of lime upon desilication of concentrated aluminate solutions does not substantially improve desilication; neither it lowers losses of $Na_2O$, while losses of $Al_2O_3$ are increased. A good effect is provided by lime only upon desilication of solutions with a concentration of at most 130-140 g/l of $Al_2O_3$.

For solutions with 88.2 g/l of $Al_2O_3$, 119.6 g/l of $Na_2O$ and 3.86 g/l of $SiO_2$, desilication at the temperature of 130° C. with different additives provides the following results:

| Additive of CaO, g/l | 0 | 5 | 10 | 15 | 20 |
|---|---|---|---|---|---|
| Silica ratio | 140 | 185 | 188 | 385 | 413 |
| Losses of $Al_2O_3$, % | 2.0 | 6.2 | 6.4 | 10.7 | 10.3 |

Even in this case it is impossible to produce top-grade alumina. /cf. A. I. Liner "Alumina Production", Metallurgy Publishing House, Moscow, 1961, pp. 503-504/.

Also known is a process for desilication of aluminate solutions with the addition of white slime instead of lime.

Desilication of solutions with the addition of white slime is slightly improved. Losses of alkali and especially of $Al_2O_3$ in desilication with the addition of white slime are substantially lower than in desilication with lime.

Though desilication with white slime is economically more efficient than that with lime, since lime is not consumed, it is still impossible to substantially purify solutions from silica. The silica modulus of the solution MSi is 500-600 /cf. A. I. Liner "Alumina Production", Metallurgy Publishing House, Moscow, 1961, p. 505).

A known process for desilication of aluminate solutions involves a two-stage treatment of aluminate solutions with calcium-containing additives. In the first stage of the process an aluminate solution is mixed with white slime resulting from the second stage of desilication and delivered to an autoclave desilication. The pulp from the autoclaves is fed to thickening and filtration. The filtered slime is repulped (liquefied) and employed in the production of alumina for the formulation of an alumina-containing charge. The filtered solution is subjected to desilication in stirred vessels under atmospheric pressure. As the desilication additive use is made of lime milk and a portion of the lime slime of the first desilication stage. A deeply-desilicated aluminate solution in the form of a pulp is delivered to thickening to a thickener unit. The thickened secondary lime slime is divided into two streams: one is fed to the first stage of desilication, the other to the second stage as a seeding agent. The aluminate solution effluent from the thickener units is subjected to a control filtration and delivered to carbonization (cf. I. Z. Pevzner, N. A. Makarov "Desilication of Aluminate Solutions", Metallurgy Publishing House, Moscow, 1974, L pp. 102-104).

However, a high-quality alumina cannot be produced on a commercial scale by the prior art process, since the final product is contaminated with silica. Furthermore, power and material consumption rates are also too high. Steam consumed per ton of $Al_2O_3$ amounts to 1–1.5 Gcal; lime is consumed in an amount of 300–400 kg per ton of $Al_2O_3$.

OBJECT OF THE INVENTION

It is an object of the present invention to provide such a process for desilication of aluminate solutions which would make it possible to increase the degree of purification thereof from silicon.

BRIEF SUMMARY OF THE INVENTION

The process according to the present invention comprises treating the aluminate solution first with a calcium-containing reagent "a" which is a product of the reaction of desilication of an aluminate solution which product contains mainly calcium hydrogarnet of the formula: $3CaO.Al_2O_3.nSiO_2(6-2n)H_2O$, wherein $n \leq 1$ and then with a reagent "b" of the formula: $4CaO.Al_2O_3.(0.1-0.6)X.mH_2O$, wherein X is $CO_2$ and/or $SO_3$, $m = 8-15$.

The treatment of the solution with reagent "a" is conducted for a period of from 0.5 to 2.0 hours at a temperature within the range of from 40° to 105° C.

In desilication of the aluminate solution the amount of reagent "b" is calculated from the weight ratio "b"/$SiO_2 = 10-50$, preferably 10–25, the weight ratio between reagents "a" and "b" being maintained within the range of $a:b = (1-3):1$.

Reagent "b" is produced upon the reaction of components $CaO$, $Al_2O_3$, $Na_2CO_3$, $K_2CO_3$, $Na_2SO_4$, $K_2SO_4$ in the aluminate solution at a molar ratio of $CaO/Al_2O_3 = 3.75-5.0$ and $Y/Al_2O_3 = 0.1-0.6$, wherein $Y = Na_2CO_3$, $K_2CO_3$, $Na_2SO_4$, $K_2SO_4$.

The process according to the present invention makes it possible to completely remove the harmful impurity of $SiO_2$ from the aluminate solution. Owing to the present invention the degree of purification of aluminate solutions from $SiO_2$ determined by a silicon modulus $\mu Si$ (weight ratio of $Al_2O_3/SiO_2$) reaches a high value of $\mu Si = 50,000$. From such aluminate solutions purified deeply from silicon it is possible to obtain a high-quality alumina with a content of $SiO_2$ of from 0.001 to 0.02%.

DETAILED DESCRIPTION OF THE INVENTION

The desilication process according to the present invention with the use of the above-mentioned reagents "a" and "b" may be conducted under atmospheric pressure within a wide temperature range of from 40° to 105° C. However, it is preferable to carry out the process at a temperature within the range of from 60° to 90° C. Within this temperature range the process occurs more intensively. Below 60° C. the desilication process proceeds very slowly, while at a temperature above 90° C. additional power consumption is required. For this reason, it is advisable to perform the process at a temperature within the range of from 60° to 90° C.

The amount of the above-mentioned reagents "a" and "b" may be selected also within a wide range. The amount of the reagent "b" as calculated for CaO is determined by a weight ratio $CaO/SiO_2$ in a solution ranging from 5 to 50. The amount of reagent "b" below 5 is undesirable, since in this case the solution desilication is impaired, while its amount above 50 does not provide any additional effect, since in this case solutions are completely purified from $SiO_2$.

It is preferable that the amount of reagent "b" calculated for CaO be within the range of the weight ratio $CaO/SiO_2$ values of from 10 to 25. In this case there is no any extra consumption of the reagent. The content of the reagent "a" in the desilication process is determined by the quantitative content of reagent "b" and established experimentally for every particular amount of "b".

It is preferable that the ratio between "a" and "b" be kept within the range of $a:b = (1-3):1$, i.e. from one to three parts by weight of reagent "a" may be taken for one part by weight of reagent "b". At such a ratio of the reagents the desilication process proceeds at a highest intensity. At a ratio "a":"b" above 3 losses of alumina may occur due to hydrolysis, while at values of $a:b$ below 1 the desilication process proceeds but very slowly.

An important and obligatory condition of the desilication process is the sequence of treatment of aluminate solutions with the reagents "a" and "b", namely: first with "a" and then with "b". When this sequence is not obeyed, no desired effect of $SiO_2$ elimination would be obtained. The time interval between the addition of components "a" and "b" is defined depending on the temperature and amount of reagent "a" and may be varied within the range of from 15 minutes to three hours. Thus, at the temperature of the aluminate solution of 40° C. the time interval is about 3 hours, while at the temperature of 100° C. it is about 30–40 minutes; i.e. with increasing temperature the time interval between the addition of components "a" and "b" is reduced. At small amounts of reagent "a" the interval between the introduction of "a" and "b" is increased. With increasing amount of "a" this interval is reduced.

Thus, at the amount of reagent "a" of 10 g/l the time interval is equal to 2.5 hours, at 30 g/l it is reduced to 30 minutes. Taking into account the relationship of time intervals, temperature and amount of reagent "a", it is preferred to select this time interval between the addition of reagents "a" and "b" within the limits of from 0.5 hour to 2 hours.

As it has been mentioned hereinabove, reagent "a" comprises a solic product of the reaction of desilication of an aluminate solution. It consists mainly of 60–90% of calcium hydrogarnet of the formula: $3CaO.Al_2O_3.nSiO_2(6-2n)H_2O$ wherein n is $\leq 1$, the remaining portion being represented by calcium-containing compounds, $CaCO_3$; the component "b" is a product of the formula:

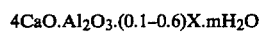

$$4CaO.Al_2O_3.(0.1-0.6)X.mH_2O$$

wherein X is $CO_2$ and/or $SO_3$; $m = 8$ to 15 these reagents facilitate the desilication process.

On completion of the desilication reaction the resulting slurry is thickened, the reaction product "a" is separated and recycled to the starting aluminate solution for desilication.

The clarified desilicated aluminate solution is fed to a further treatment to produce alumina.

The above-mentioned reagent "b" is produced from those components and in those media which are characteristic for the production of alumina from aluminous raw materials, namely CaO, Al$_2$O$_3$, Na$_2$CO$_3$, K$_2$CO$_3$, Na$_2$SO$_4$, K$_2$SO$_4$.

To produce the reagent "b", the desilicated aluminate solution containing usually said carbonate and sulphate salts is treated with lime at molar ratios of CaO/Al$_2$O$_3$ in an aluminate solution of 3.75–5.0 and Y/Al$_2$O$_3$ in an aluminate solution equal to 0.1–0.6.

In the case where the concentration of compound "Y" in the desilicated aluminate solution is insufficient to keep the above-mentioned value of the ratio Y/Al$_2$O$_3$ within the range of from 0.1 to 0.6, the required amount of said components is added to the aluminate solution along with the alkali or carbonate solution, i.e. those solutions which are obtained during the recovery of aluminium hydroxide from desilicated solutions in the manufacture of alumina. It is possible to correct the ratio Y/Al$_2$O$_3$ by the addition of carbonate or sulphate salts or mixtures thereof.

Another embodiment of the preparation of the reagent "b" stipulates a partial substitution of CaO by 50% by weight with CaCO$_3$ (limestone, chalk, slime); this enables a substantial reduction of power consumption necessary in the production of CaO. It should be noted, however, that such substitution is allowable with the provision that the content of SiO$_2$ in calcium carbonate does not exceed 1%.

It should also be noted that the advantage of the present invention resides in that the process can be applied, in addition to aluminate solutions resulting from comprehensive processing of non-bauxite aluminous raw materials, to aluminate solutions resulting from processing of high-silica bauxite raw material by sintering. A high-quality alumina is produced by the process according to the present invention.

For a better understanding of the present invention, some specific examples illustrating desilication of aluminate solutions are given hereinbelow.

EXAMPLE 1

Into one liter of an aluminate solution having the following composition, g/l: Al$_2$O$_3$—88.5; Na$_2$O (caustic)—80; Na$_2$O (carbonate), SiO$_2$—0.3 (silicon modulus of the solution being about 400), there are introduced 23 g/l of a product of the reaction of desilication "a" consisting, by 90%, of calcium hydrogarnet 3CaO.Al$_2$O$_3$.0.2SiO$_2$.5.6H$_2$O and 10% of CaCO$_3$. The slurry is stirred at the temperature of 85° C. and added with 11.5 g/l of reagent "b" having the formula: 4CaO.Al$_2$O$_3$.0.4CO$_2$.11H$_2$O, or as calculated for CaO, 5 g/l of CaO. The ratio between reagents "a" and "b" is equal to 2. The reagent "b" is produced by reacting components CaO, Al$_2$O$_3$, Na$_2$CO$_3$ in the aluminate solution at the molar ratios of CaO/SiO$_2$=3.75 and Na$_2$CO$_3$/Al$_2$O$_3$=0.1. The weight ratio of the reaction product "a" to the reagent "b" is equal to 2.0; the amount of reagent "b" relative to SiO$_2$ of the solution is 13. Thereafter, the solution is subjected to agitation at the temperature of 85° C. After the treatment an aluminate solution is obtained containing only traces of SiO$_2$. The silicon modulus of the solution is equal to 50,000. The solution is filtered and a portion of the solid product of the desilication reaction consisting predominantly from calcium hydrogarnet in the amount of 23 g/l (as it has been shown hereinabove) is recycled to the starting aluminate solution; the balance amount of the product of desilication is withdrawn from the process and delivered to the preparation of a charge for the manufacture of alumina. From the aluminate solution containing only traces of silica aluminium hydroxide is crystallized which, upon a further calcination, ensures the production of alumina of a high quality containing SiO$_2$ only in the amount of 0.015%.

EXAMPLE 2

The desilication process is conducted in a manner similar to that described in the foregoing Example 1. The distinction resides in that into the aluminate solution there are introduced 46 g/l of the reaction product of desilication "a" consisting, by 90%, of calcium hydrogarnet of the formula:

3CaO.Al$_2$O$_3$X0.4SiO$_2$X5.2H$_2$O and 10% of CaCO$_3$. The slurry is agitated for two hours at the temperature of 100° C. and then to the solution there are added 23 g/l of the reagent "b" of the formula:

4CaOXAl$_2$O$_3$x0.4CO$_2$x11H$_2$O which, as calculated for CaO, equals to 10 g/l; the component "b" is obtained through the interaction of CaO, Al$_2$O$_3$, K$_2$CO$_3$ in the aluminate solution at the molar ratio of CaO/SiO$_2$ equal to 5.0 and K$_2$CO$_3$/Al$_2$O$_3$ equal to 0.6; the amount of the reagent "b" relative to SiO$_2$ of the solution is 26. The ratio "a":"b"=2.

The aluminate solution along with the additives is agitated for 5 hours at the temperature of 80° C. After treatment an aluminate solution is obtained having silicon modulus of 8,000, i.e. only traces of SiO$_2$ being present therein.

EXAMPLE 3

The desilication process is conducted in a manner similar to that described in the foregoing Example 1, except that into the aluminate solution there are added 23 g/l of the reagent "a" (the product of the reaction of desilication); the slurry is agitated for two hours at the temperature of 40° C. Then, 11.5 g/l of reagent "b" are added to the solution and the mixture is agitated for 8 hours at the temperature of 40° C. The ratio of the reagents "a" and "b" is equal to 1. After the treatment the resulting solution has silicon modulus of 3,000.

EXAMPLE 4

Into 1 liter of an aluminate solution containing, g/l: Al$_2$O$_3$—88.5; Na$_2$O (caustic)—80; Na$_2$O (carbonate)—8.5; SiO$_2$—0.3 (i.e. the composition of the solution is similar to that described in Example 1), there are added 20 g/l of lime CaO. The slurry is agitated at the temperature of 130° C. for 8 hours. As a result, an aluminate solution is obtained containing SiO$_2$ in the amount of 0.20 g/l or having silicon modulus of 440.

As it follows from comparison of Examples 1–3 illustrating the process according to the present invention and Example 4 illustrating the prior art process, the process according to the present invention makes it possible to obtain aluminate solutions with a silicon modulus exceeding by dozens times that of a solution obtained in the conventional process.

What is claimed is:

1. A process for desilication of an aluminate solution comprising successively treating said aluminate solution first with a reagent "a", which is a desilication product consisting essentially of calcium hydrogarnet of the formula:

$3CaO.Al_2O_3.nSiO_2.(6-2n)H_2O$, where $n \leq 1$, and after a period of 0.5 to 2 hours, without separating the reagent "a", at a temperature of 40° to 105° C., with a reagent "b" of the formula: $4CaO.Al_2O_3.(0.1-0.6)X.mH_2O$, where $X=CO_2$, $SO_3$, or a mixture thereof, and $m=8-15$, at a weight ratio of $b/SiO_2=5-50$, and weight ratio of said reagents $a:b=1-3:1$.

2. A process according to claim 1, wherein the amount of reagent "b" as calculated for CaO is determined by a weight ratio "b"/$SiO_2$=10-25.

3. A process according to claim 1, wherein the employed reagent "b" is produced by reacting components CaO, $Al_2O_3$, $Na_2CO_3$, $K_2CO_3$, $Na_2SO_4$ and $K_2SO_4$ in an aluminate solution at molar ratios of $CaO/Al_2O_3$=3.75-5.0 and $Y/Al_2O_3$=0.1-0.6, wherein $Y=Na_2CO_3$, $K_2CO_3$, $Na_2SO_4$, $K_2SO_4$ or a mixture thereof.

4. The process of claim 3 wherein said components are reacted at a temperature of 60° to 90° C.

* * * * *